(12) United States Patent
Ganadas et al.

(10) Patent No.: US 10,740,389 B2
(45) Date of Patent: Aug. 11, 2020

(54) REMEMBERING AUDIO TRACES OF PHYSICAL ACTIONS

(71) Applicant: Microsoft Technology Licensing, LLC, Redmond, WA (US)

(72) Inventors: Priya Ganadas, Seattle, WA (US); Adolfo Hernandez Santisteban, Bothell, WA (US); Aaron Daniel Krauss, Snoqualmie, WA (US); Andrew Frederick Muehlhausen, Seattle, WA (US)

(73) Assignee: Microsoft Technology Licensing, KKC, Redmond, WA (US)

( * ) Notice: Subject to any disclaimer, the term of this patent is extended or adjusted under 35 U.S.C. 154(b) by 232 days.

(21) Appl. No.: 15/951,826

(22) Filed: Apr. 12, 2018

(65) Prior Publication Data

US 2019/0318033 A1    Oct. 17, 2019

(51) Int. Cl.
| | | |
|---|---|---|
| *G06F 17/00* | (2019.01) | |
| *G06F 16/61* | (2019.01) | |
| *G10L 25/51* | (2013.01) | |
| *G06F 16/683* | (2019.01) | |
| *G06F 16/68* | (2019.01) | |
| *G06F 16/9535* | (2019.01) | |

(52) U.S. Cl.
CPC ............ *G06F 16/61* (2019.01); *G06F 16/683* (2019.01); *G06F 16/686* (2019.01); *G06F 16/9535* (2019.01); *G10L 25/51* (2013.01)

(58) Field of Classification Search
CPC .... G06F 16/61; G06F 16/683; G06F 16/9535; G06F 16/686

USPC .................................................. 707/600–899
See application file for complete search history.

(56) References Cited

U.S. PATENT DOCUMENTS

| | | |
|---|---|---|
| 7,825,813 B2 | 11/2010 | Farhan |
| 9,484,030 B1 | 11/2016 | Meaney et al. |
| 9,591,721 B2 | 3/2017 | Nolan et al. |
| 9,668,073 B2 | 5/2017 | Das et al. |
| 9,749,692 B2 | 8/2017 | Hayton et al. |
| 2010/0110834 A1 | 5/2010 | Kim et al. |
| 2014/0088965 A1* | 3/2014 | Goel ................. G10L 17/08 704/246 |

(Continued)

OTHER PUBLICATIONS

Stager, et al., "Implementation and Evaluation of a Low-Power Sound-Based User Activity Recognition System", In Proceedings of Eighth IEEE International Symposium on Wearable Computers, Oct. 31, 2004, pp. 138-141.

(Continued)

*Primary Examiner* — Isaac M Woo
(74) *Attorney, Agent, or Firm* — Arent Fox LLP

(57) ABSTRACT

Methods and devices for creating a sound log of activities may include receiving a detected sound from at least one sensor on a computer device. The methods and devices may include comparing the detected sound to a plurality of audio patterns stored in a sound database. The methods and devices may include identifying a sound event for the detected sound based at least upon the comparison of the detected sound to the plurality of audio patterns. The methods and devices may include identifying context information that provides a context for the sound event. The methods and devices may include updating a sound log with the sound event and the context information.

20 Claims, 7 Drawing Sheets

(56) References Cited

U.S. PATENT DOCUMENTS

2016/0150333 A1  5/2016  Goldstein et al.
2017/0206273 A1  7/2017  Tannenbaum et al.

OTHER PUBLICATIONS

Watanabe, et al., "A Method for Embedding Context to Sound-Based Life Log", In Journal of Information Processing, vol. 22, Issue 4, Oct. 2014, pp. 651-659.
"International Search Report and Written Opinion Issued in PCT Application No. PCT/US19/024165", dated Jun. 5, 2019, 12 Pages.

\* cited by examiner

| Sound Object | Time | Location | Sound Event |
|---|---|---|---|
| Door | 7:00 AM | Home | Door Open |
| Door | 7:01 AM | Home | Door Close |
| Key | 7:01 AM | Home | Lock Door |
| Coffee Cup | 10:00 AM | Work | Placing Coffee Cup on Desk |
| ⋮ | ⋮ | ⋮ | ⋮ |

FIG. 2

REMEMBERING AUDIO TRACES OF PHYSICAL ACTIONS

BACKGROUND

The present disclosure relates to computer devices and audio awareness of environments.

During a day a user typically performs multiple actions in autopilot and may not have an active memory about the actions performed. As such, a user may not remember if they turned off a stove and/or shut a door. Previously, a user may have used a network of sensors (e.g., accelerometers and/or cameras) to aid in tracking their actions. However, if the cameras were not activated and/or a user had privacy concerns about having a camera activated, the user's actions may not have been captured.

Thus, there is a need in the art for improvements in awareness of environments surrounding a user.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the memory and the processor. The operating system may be operable to: receive, from at least one sensor on the computer device, a detected sound; compare the detected sound to a plurality of audio patterns stored in a sound database; identify a sound event for the detected sound based at least upon the comparison of the detected sound to the plurality of audio patterns; identify context information that provides a context for the sound event; and update a sound log with the sound event and the context information.

Another example implementation relates to a method for creating a sound log of activities. The method may include receiving, at an operating system executing on a computer device, a detected sound from at least one sensor on the computer device. The method may include comparing the detected sound to a plurality of audio patterns stored in a sound database. The method may include identifying a sound event for the detected sound based at least upon the comparison of the detected sound to the plurality of audio patterns. The method may include identifying context information that provides a context for the sound event. The method may include updating a sound log with the sound event and the context information.

Another example implementation relates to computer-readable medium storing instructions executable by a computer device. The computer-readable medium may include at least one instruction for causing the computer device to receive, from at least one sensor on the computer device, a detected sound. The computer-readable medium may include at least one instruction for causing the computer device to compare the detected sound to a plurality of audio patterns stored in a sound database. The computer-readable medium may include at least one instruction for causing the computer device to identify a sound event for the detected sound based at least upon the comparison of the detected sound to the plurality of audio patterns. The computer-readable medium may include at least one instruction for causing the computer device to identify context information that provides a context for the sound event. The computer-readable medium may include at least one instruction for causing the computer device to update a sound log with the sound event and the context information.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

In the drawings:

FIG. 2 is an example sound log for use with a computer device in accordance with an implementation of the present disclosure;

DETAILED DESCRIPTION

This disclosure relates to devices and methods for ambient audio awareness of a space. The devices and methods may identify and detect audio footprints based on a user's physical actions and/or events. The audio footprints may help trigger digital cues and/or create a user sound log based on location and/or context of the actions. The methods and devices may have a portable audio sensor (e.g., a microphone on a mobile device) and/or a network of sensors with a microphone or microphone array located around a user's environment constantly looking for audio patterns. The methods and devices may compare a detected sound to a plurality of audio patterns in a sound database to identify whether the detected sound corresponds to a recognized audio pattern. Once the devices and methods recognize an audio pattern, the devices and methods may keep track of an associated audio event to the audio pattern based on the user's location and/or other context information.

The devices and methods may create a digital sound log of user actions based at least on the identified audio patterns that are not being commonly tracked by sensors. For example, the devices and methods may create a digital log of when a user feeds a dog, turns off a stove, and/or closes a door. The devices and methods may query the sound logs for recommendations to provide a user and/or provide responses to a user's questions. For example, a user may ask if they closed a door and the devices and methods may query the sound log for a response to the question (e.g., "no, you did not close the door).

As such, the devices and methods may remember user actions (direct and indirect awareness) based at least on habits by listening to your daily sounds with an audio sensor. The devices and methods may continually adapt to a user's daily activities and may identify new user actions when a user's daily sounds change. In addition, the devices and methods may eliminate the use of extra sensors to track actions around a user by just using the microphone on a personal device. Moreover, the devices and methods may associate context information with the identified sound events to provide an understanding of events taking place around the user, when the events occurred, and/or to provide a context to the events.

Figure 1:
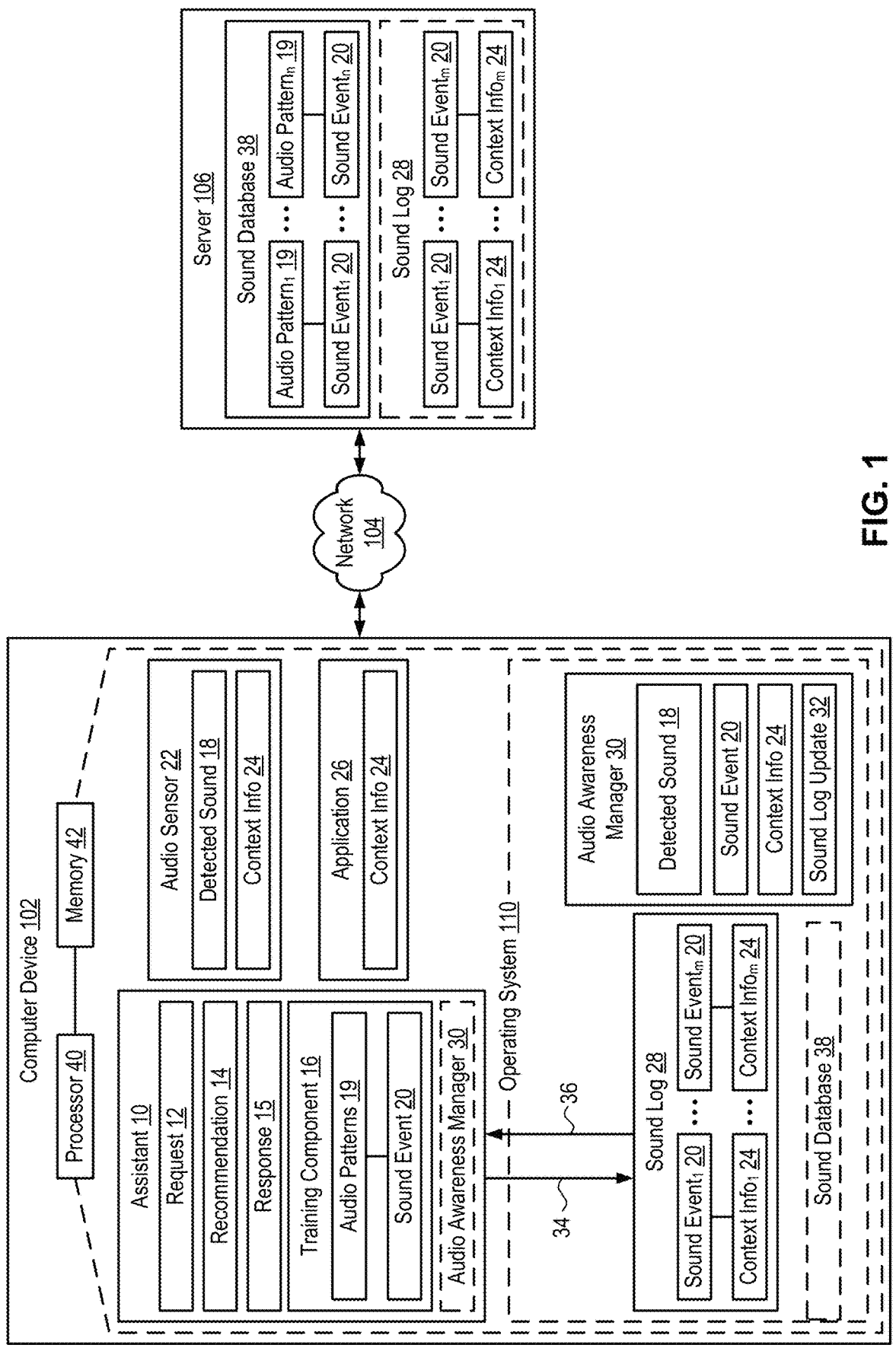
FIG. 1 is a schematic block diagram of an example computer device in accordance with an implementation of the present disclosure.

Referring now to FIG. 1, illustrated is a system 100 for use with ambient audio awareness of a space. System 100 may include a computer device 102 in communication with one or more servers 106 via a wired or wireless network 104. Computer device 102 may include one or more audio sensors 22, such as a microphone, that may detect sounds 18 occurring around a user. The audio sensors 22 may be constantly looking for sounds 18 that occur in a user's day. In an implementation, the audio sensors 22 may be a network of sensors with a microphone or microphone array located around the user's environment looking for sounds 18 occurring around the user.

Computer device 102 may also include a digital assistant 10 executed by processor 40 and/or stored by memory 42 that may aid a user by performing tasks and/or services for the user. The user may use assistant 10 to provide an ambient audio awareness service that provides an understanding of events taking place around the user, when the events occurred, and/or context to the events.

Assistant 10 may include a training component 16 that may be used by the user to train a sound database 38 to associate sound events 20 of actions performed by the user to audio patterns 19. Sound events 20 may describe an action performed by a user (e.g., turn off car, shut door, lock door). The user may provide as input to the training component 16 a variety of audio patterns 19 and may also identify the sound event 20 for each of the audio patterns 19 provided. For example, the audio pattern 19 may include a user placing a coffee cup on their desk at work. The user may notify the training component 16 that the sound event 20 associated with the audio pattern 19 is "placing a coffee cup on a desk." In another example, a user may move their keys the audio pattern 19. The user may notify the training component 16 that the sound event 20 associated with the audio pattern 19 is "my house keys." The training component 16 may communicate the received audio patterns 19 and the associated sound event 20 to the sound database 38.

In an implementation, the training component 16 may access a shared sound library and may add audio patterns 19 and associated sound events 20 from the shared sound library. For example, a manufacturer of appliances may upload the sounds from the different appliances they manufacture, along with the identifications of the sounds into a shared sound library. The training component 16 may transmit the audio patterns 19 and the associated sound events 20 to the sound database 38.

In another implementation, the training component 16 may communicate with various internet of things (IoT) devices in an environment around the computer device 102 (e.g., a user's home and/or work) to train the sound database 38. For example, when a toaster pops up toast, the toaster may communicate with the training component 16 that the sound the toaster made corresponds to "popping up." The training component 16 may transmit the audio pattern 19 and the corresponding sound event 20 (e.g., "toaster popping up") to the sound database 38.

In another implementation, the training component 16 may continuously train in the background of computer device 102. The training component 16 may continually listen to the detected sounds 18 and may identify audio patterns 19 that keep repeating in the detected sounds 18. For example, the training component 16 may implement one or more machine learning algorithms to continuously listen to detected sounds 18 in the user's environment and identify repeating audio patterns 19.

Upon identifying the repeating audio patterns 19, assistant 10 may notify the user of the repeating audio patterns 19. For example, the user may identify the repeating audio patterns 19 as useful. As such, the user and/or the training component 16 may identify the corresponding sound events 20 to describe the repeating audio patterns 19 and the training component 16 may update the sound database 38 with the audio patterns 19 and the corresponding sound events 20. As such, sounds created because of a user's routine and/or habit during daily activities may be identified and uploaded into the sound database 38. Moreover, if a user goes through a change in lifestyle, training component 16 may continually adapt to a user's daily activities and may identify new repeating audio patterns 19 to include in the sound database 38. As such, training component 16 may continually adapt to a user's daily activities and may identify new user actions when a user's daily sounds change.

Computer device 102 may include an operating system 110 executed by processor 40 and/or memory 42. Memory 42 of computer device 102 may be configured for storing data and/or computer-executable instructions defining and/or associated with operating system 110, and processor 40 may execute such data and/or instructions to instantiate operating system 110. An example of memory 42 can include, but is not limited to, a type of memory usable by a computer, such as random access memory (RAM), read only memory (ROM), tapes, magnetic discs, optical discs, volatile memory, non-volatile memory, and any combination thereof. An example of processor 40 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may include an audio awareness manager 30 that may receive the detected sound 18 and may compare the detected sounds 18 to a sound database 38 to aid in identifying the detected sound 18. In an implementation, audio awareness manager 30 may be part of assistant 10 and/or server 106.

Audio awareness manager 30 may compare the detected sound 18 to a plurality of audio patterns 19 (up to n, where n is an integer) stored in the sound database 38 and may identify an associated sound event 20 for the audio patterns 19. The sound event 20 may describe an action performed by a user associated with the audio pattern 19. For example, the audio pattern 19 may be keys moving in a lock and the associated sound event 20 may be "locking a door." When a match occurs between the detected sound 18 and the stored audio patterns 19, audio awareness manager 30 may identify the associated sound event 20 for the detected sound 18. For example, the detected sound 18 may be a door opening. When a match occurs between a door opening stored audio pattern 19 and the detected sound 18, audio awareness manager 30 may identify the corresponding sound event 20 of "door opening" for the detected sound 18.

Sound database 38 may be on computer device 102 and/or may be on server 106. In addition, sound database 38 may be curated specifically for a user of computer device 102 based at least upon the training performed by assistant 10 for audio patterns 19 identified by the user. In an implementation, sound database 38 may be curated for a specific group of users (e.g., a family sharing a computer device 102). Sound database 38 may also be a combination of curated sounds specific to the user and/or shared sounds (e.g., general known sounds) pulled from common sound data repositories. As such, sound database 38 may provide a variety of audio patterns 19 for use in identifying the detected sound 18. In addition, sound database 38 may be shared among a plurality of users. For example, sound database may be a general sound repository that a plurality of users may access.

Audio awareness manager 30 may also identify context information 24 for the identified sound event 20 that may provide a context for the sound event 20 and/or may be used to describe the sound event 20. The context may provide a description of the sound event 20 and/or may be used to describe the sound event 20. For example, audio awareness manager 30 may identify a location of the user from a global positioning system (GPS) and/or from other location information on computer device 102. In addition, audio awareness manager 30 may communicate with one or more applications 26 on computer device 102 for context information 24. For example, audio awareness manager 30 may identify a time of the sound event 20. In addition, audio awareness manager 30 may access a calendar application to determine what a user may be doing when the sound event 20 occurred. In addition, audio awareness manager 30 may various detected sounds 18 to determine the context information 24.

As such, context information 24 may be retrieved from a variety of sources on computer device 102 to provide a context for the identified sound event 20. For example, audio awareness manager 30 may identify that a user is searching for recipes on the Internet at 6:30 p.m., while the location information of computer device 102 indicates that the user is at home. In addition, audio awareness manager 30 may detect various sounds 18 occurring in the kitchen (e.g., a user turning on a stove, closing a refrigerator, and turning on water). Audio awareness manager 30 may also detect a stove turning on. Audio awareness manager 30 may use this information to determine the context information 24 for the associated sound events 20 of turning on the stove is "cooking dinner."

Audio awareness manager 30 may also provide a sound log update 32 with the identified sound event 20 and/or associated context information 24 to a sound log 28. Sound log 28 may include a plurality of identified sound events 20 (up to m, where m is an integer) and any associated context information 24. The sound log 28 may be stored on computer device 102 and/or server 106. In addition, the sound log 28 may capture a chronological daily record of a user's sound events 20 and associated context information 24. Sound log 28 may be used by an assistant 10 and/or the user to provide an understanding of events taking place around the user, when the events occurred, and/or to provide a context to the events.

Assistant 10 may periodically query 34 the sound log 28 to identify specific sound events 36 around a user. Assistant 10 may use the specific sound events 36 and the corresponding context information 24 to provide one or more recommendations 14 and/or insights to the user. For example, assistant 10 may identify a sound event 36 of a "door open" and realize that a corresponding "door close" sound event may be missing from the sound log 28. Assistant 10 may notify a user that they may have left a back door open when leaving the house. In another example, assistant 10 may identify a sound event 36 of a front door opening in a store and may realize that the owner is currently located in the back of the store when the door opened. Assistant 10 may notify the owner that the front door of the store opened.

In addition, assistant 10 may receive a query and/or request 12 from a user and may provide a responses 15 to the user. Assistant 10 may query 34 the sound log 28 in response to the request 12. For example, a user may ask assistant 10 "where are my keys?" Assistant 10 may query 34 the sound log 28 for key sound events 20 and may retrieve the identified key sound events 36 and corresponding context information 24. The context information 24 may indicate that the keys are next to the sink. Assistant 10 may use the context information 24 to notify the user that "the keys are next to the sink."

In another example, a user may be driving to work and may not remember closing the door when he left for work because he was talking on the phone. The user may ask assistant 10 "did I close the door?" while driving to work. Assistant 10 may query 34 the sound log 28 and may identify a sound event 36 of "door open" in the context of leaving for work. Assistant 10 may identify that there is a corresponding "door close" sound event 20 missing from the sound log 28. As such, assistant 10 may respond to the user "no, you did not close the door."

In another example, a user may ask assistant 10 "did I turn off the car?" Assistant 10 may query 34 the sound log 28 for sound events 20 related to the user's car. Assistant 10 may identify a sound event 36 of "locking the car." Assistant 10 may use the identified sound event 36 of "locking the car" to respond to the user "yes, I heard you lock the car."

As such, assistant 10 may be used to detect sounds around a user and help the user remember actions that the user takes in autopilot that the user may not have a memory about the actions taken. In addition, assistant 10 may use the sound log 28 to gather data to help provide insights and/or recommendations to the user.

Assistant 10 may provide audio recommendations 14 and/or responses 15 to the user, visual recommendations 14 and/or responses 15 to the user (e.g., may display a notice on a screen), and/or may provide various messages (e.g., e-mail, SMS, video) to the user. The user may have previously established a preference with assistant 10 for interacting with assistant 10 and/or accessing information from assistant 10.

As such, system 100 may be used to remember user actions (direct and indirect awareness) by listening to a user's daily sounds with an audio sensor 22. Moreover, if a user goes through a change in lifestyle, system 100 may continually adapt to a user's daily activities and may identify new user actions when a user's daily sounds change. In addition, system 100 may eliminate the use of extra sensors to track actions around a user by just using the audio sensors 22 on computer device 102. Moreover, system 100 may associate context information 24 with the identified sound events 20 to provide an understanding of events taking place around the user, when the events occurred, and/or to provide a context to the events.

Referring now to FIG. 2, an example sound log 28 for use with computer device 102 and/or server 106 may include a sound object 202 for the detected sound 18 (FIG. 1), a corresponding time 204 for the sound object 202, a location 206 where the sound object 202 occurred, and/or a sound event 20 describing the sound object 202. The time 204 and location 206 may be included in the context information 24 associated with the sound event 20.

For example, row 208 of the sound log 28 may include "door" as the sound object 202 recorded at 7:00 a.m. at home. The corresponding sound event 20 may include "door open." Row 210 of the sound log 28 may include "door" as the sound object 202 recorded at 7:01 a.m. at home. The corresponding sound event 20 may include "door close." Row 212 of the sound log 28 may include "key" as the sound object 202 recorded at 7:01 a.m. at home. The corresponding sound event 20 may include "lock door." Row 214 may include "coffee cup" as the sound object 202 recorded at 10:00 a.m. at work. The corresponding sound event 20 may include "placing coffee cup on desk."

As such, the sound log 28 may capture a chronological daily record of a user's sound events 20 and associated context information 24. Sound log 28 may be used to provide an understanding of events taking place around the user, when the events occurred, and/or to provide a context to the events.

Figure 3:
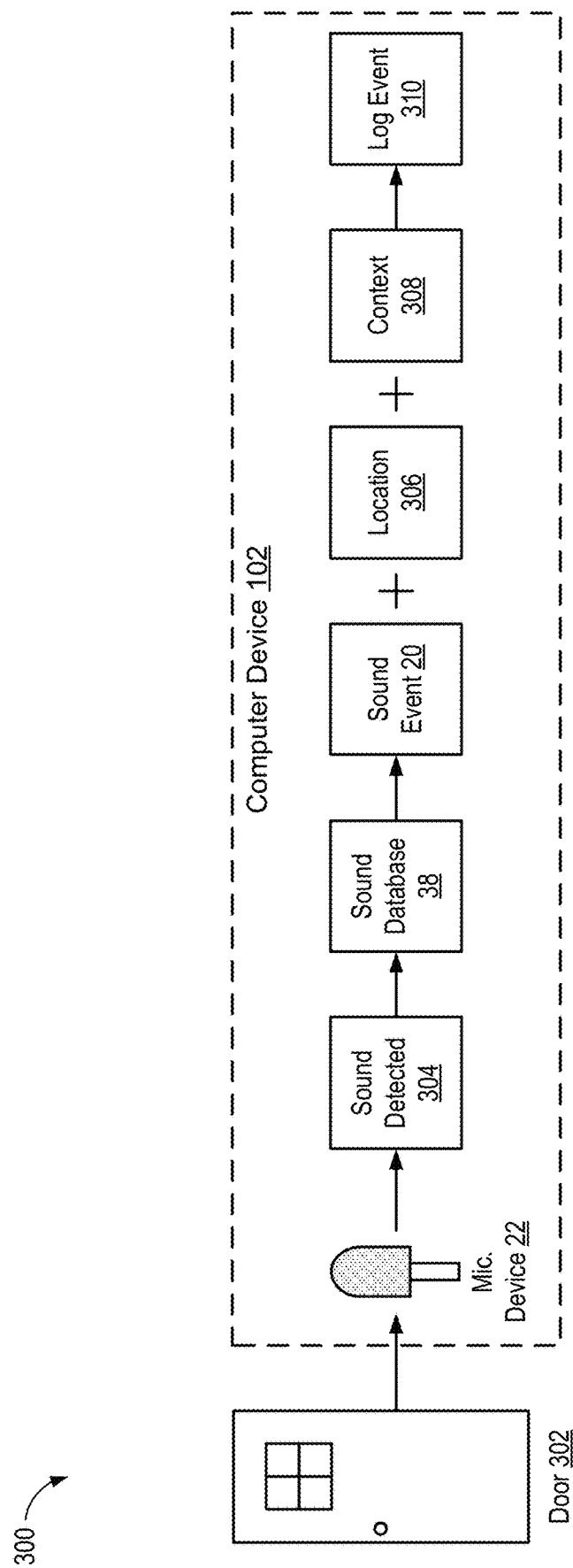
FIG. 3 is an example method flow for updating a sound log in accordance with an implementation of the present disclosure.

Referring now to FIG. 3, illustrated is an example method flow 300 that may be used by computer device 102 to update a sound log 28 (FIG. 1). A microphone 22 on computer device 102 may detect a door 302 closing. The detected sound 304 of the door closing may be transmitted to a sound database 38 for comparison with the stored audio patterns 19 of sounds. When a match occurs between the detected sound 304 of the door closing and a stored audio pattern 19, a sound event 20 corresponding to the audio pattern 19 may be identified. For example, the sound event 20 may be "door close." In addition, computer device 102 may identify a location 306 of the computer device 102, for example, by using a GPS or other location information on computer device 102. Computer device 102 may also identify a context 308 of the sound event 20. Computer device may log the sound event 310 in the sound log 28, along with the location 306 information and/or the context 308 information.

Computer device 102 may associate the location 306 and the context 308 with the identified sound event 20 when updating sound log 28. As such, sound log 28 may provide an understanding of events taking place around the user, when the events occurred, and/or to provide a context to the events.

Figure 4:
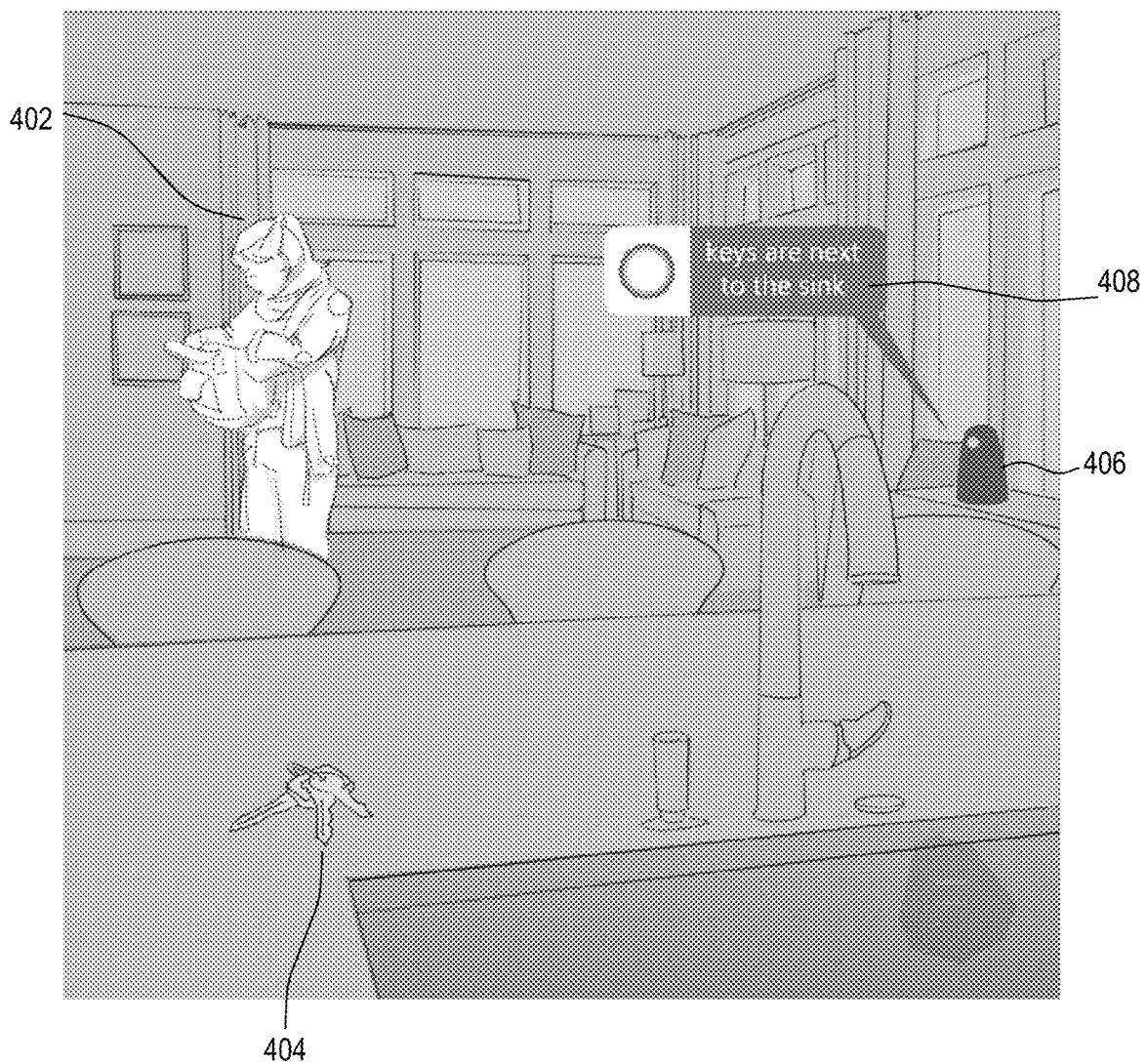
FIG. 4 is a schematic diagram illustrating a user interacting with an assistant in accordance with an implementation of the present disclosure.

Referring now to FIG. 4, an example of a user 402 interacting with an assistant 406 is illustrated. For example, user 402 may be unable to locate their keys 404 and may ask assistant 406 the question "where are my keys?" Assistant 406 may query 34 (FIG. 1) the sound log 28 (FIG. 1) for sound events 20 (FIG. 1) relating to keys. Assistant 406 may identify the most recent key sound event 20 recorded in the sound log 28 (e.g., by comparing a time associated with the key sound events 20) and may retrieve the identified sound event 36 (FIG. 1) from the sound log 28. Assistant 406 may also retrieve any associated context information 24 (FIG. 1) for the identified sound event 36. Assistant 406 may use the context information 24 to determine a location of the keys and provide a response 408 to user 402. For example, the response 408 may include the "keys are next to the sink." As such, assistant 10 may search the sound log 28 based on the question received by user 402 and provide a response 408 to user 402 based upon the search of the sound log 28.

Figure 5:
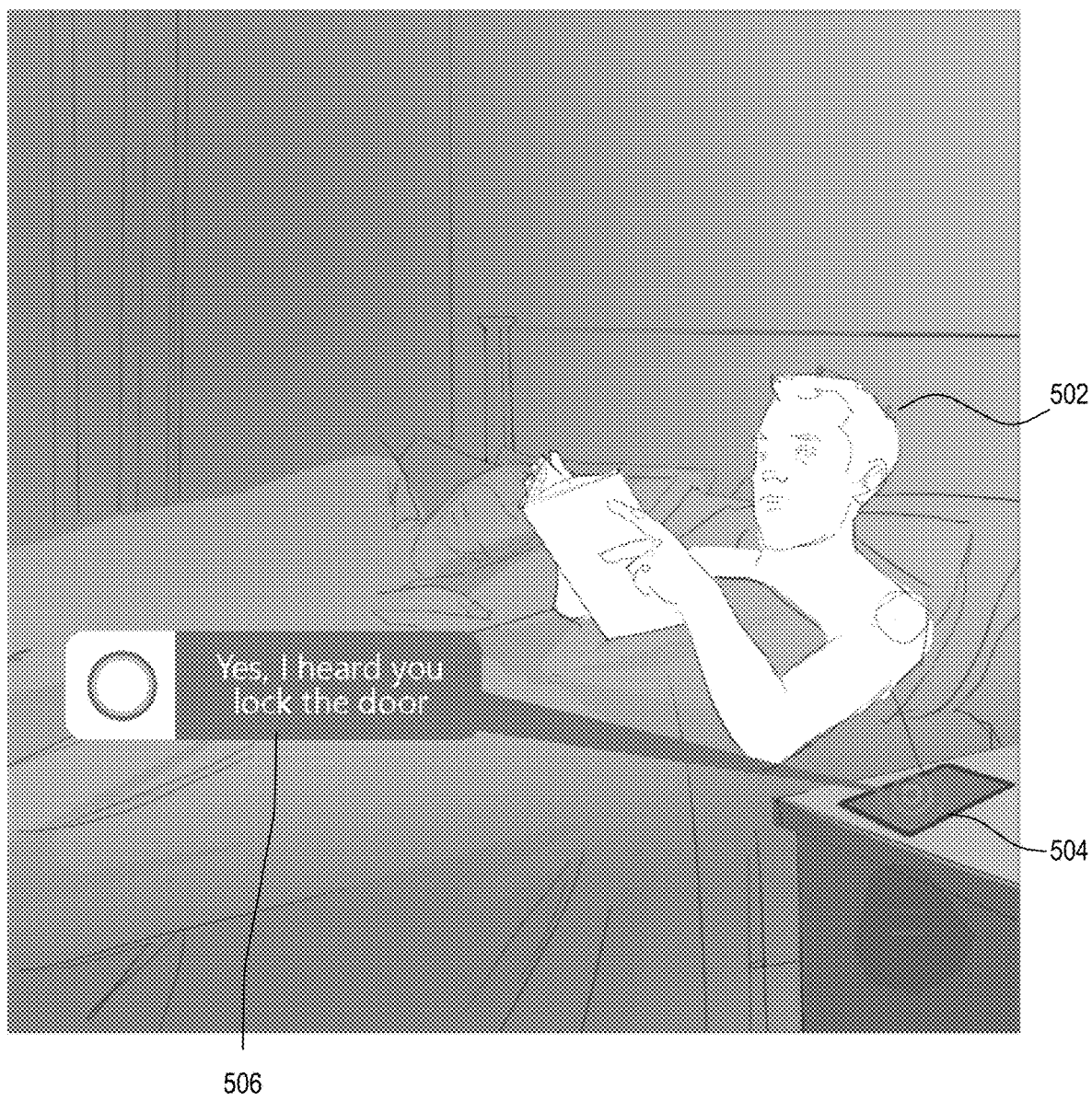
FIG. 5 is a schematic diagram illustrating a user interacting with an assistant in accordance with an implementation of the present disclosure.

Referring now to FIG. 5, an example of a user 502 interacting with an assistant 504 is illustrated. For example, user 502 may not remember locking the door and may ask assistant 504, "did I lock the door?" Assistant 504 may query 34 (FIG. 1) the sound log 28 (FIG. 1) for sound events 20 (FIG. 1) relating to doors and/or locking of doors. Assistant 504 may reviewed the sound events 20 and may identify that a sound event 20 was stored for locking the door. Assistant 504 may provide a response 506 of "yes, I heard you lock the door." As such, user 502 may be reassured that the door was locked without having to physically check whether the door was locked.

Figure 6:
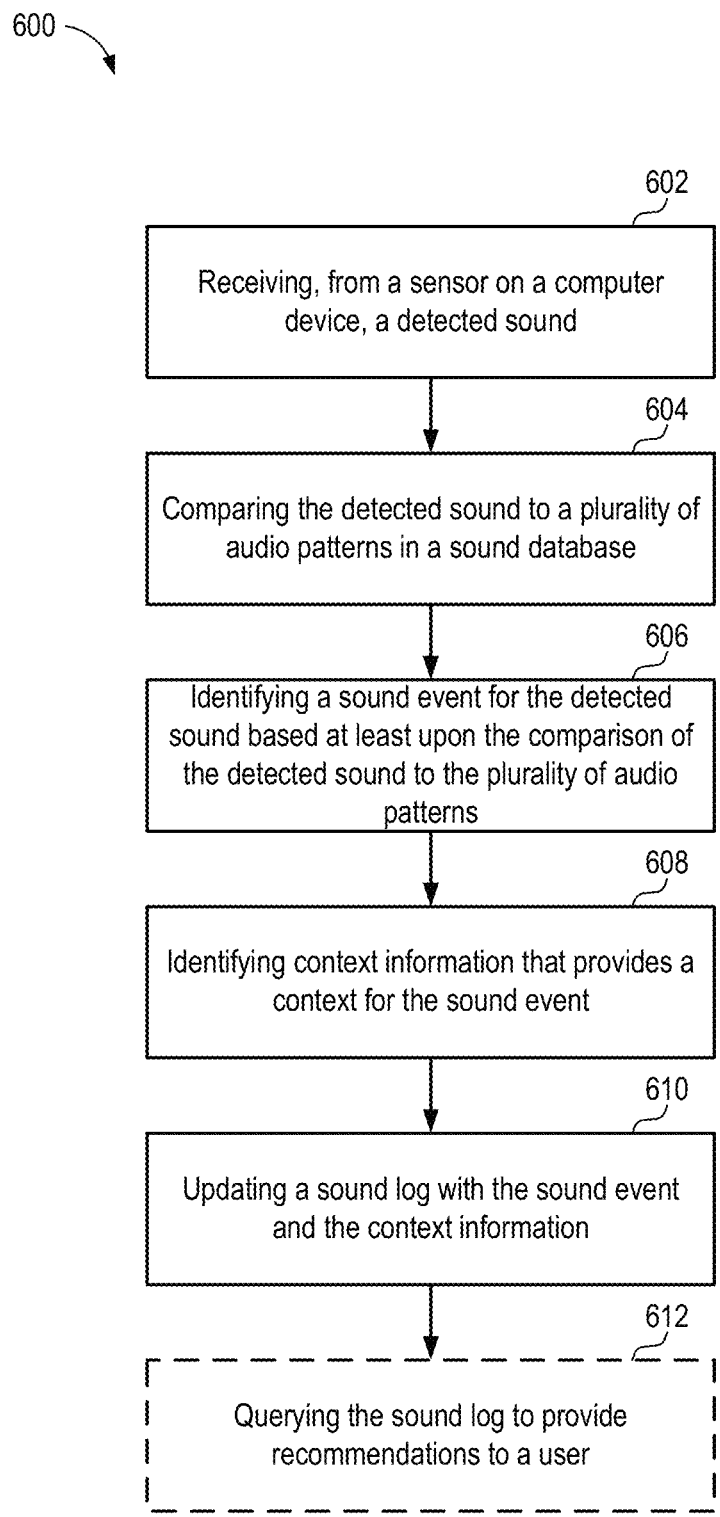
FIG. 6 is an example method flow for creating a sound log of activities in accordance with an implementation of the present disclosure.

Referring now to FIG. 6, a method flow 600 for creating a sound log 28 (FIG. 1) of activities by computer device 102 (FIG. 1) is discussed in connection with the description of the architecture of FIG. 1.

At 602, method 600 may include receiving, from a sensor on a computer device, a detected sound. Computer device 102 may include one or more audio sensors 22, such as a microphone, that may detect sounds 18 occurring around a user. The audio sensors 22 may be constantly looking for sounds 18 that occur in a user's day. In an implementation, the audio sensors 22 may be a network of sensors with a microphone or microphone array located around the user's environment looking for sounds 18 occurring around the user. An audio awareness manager 30 may receive the detected sound 18.

At 604 and 606, method 600 may include comparing the detected sound to a plurality of audio patterns in a sound database; and identifying a sound event for the detected sound based at least upon the comparison of the detected sound to the plurality of audio patterns. Audio awareness manager 30 may compare the detected sounds 18 to a sound database 38 to aid in identifying the detected sound 18.

Audio awareness manager 30 may compare the detected sound 18 to a plurality of audio patterns 19 (up to n, where n is an integer) stored in the sound database 38 and may identify an associated sound event 20 for the audio patterns 19. The sound event 20 may describe an action associated with the audio pattern 19. For example, the audio pattern 19 may be keys moving in a lock and the associated sound event 20 may be "locking a door." When a match occurs between the detected sound 18 and the stored audio patterns 19, audio awareness manager 30 may identify the associated sound event 20 for the detected sound 18. For example, the detected sound 18 may be a door opening. When a match occurs between a door opening stored audio pattern 19 and the detected sound 18, audio awareness manager 30 may identify the corresponding sound event 20 of "door opening" for the detected sound 18.

Sound database 38 may be on computer device 102 and/or may be on server 106. In addition, sound database 38 may be curated specifically for a user of computer device 102 based at least upon the training performed by assistant 10 for audio patterns 19 identified by the user. In an implementation, sound database 38 may be curated for a specific group of users (e.g., a family sharing a computer device 102). Sound database 38 may also be a combination of curated sounds specific to the user and/or shared sounds (e.g., general known sounds) pulled from common sound data repositories. As such, sound database 38 may provide a variety of audio patterns 19 for use in identifying the detected sound 18. In addition, sound database 38 may be shared among a plurality of users. For example, sound database may be a general sound repository that a plurality of users may access.

At 608, method 600 may include identifying context information that provides a context for the sound event. Audio awareness manager 30 may also identify context information 24 for the identified sound event 20 that may provide a context for the sound event 20 and/or may be used to describe the sound event 20. The context may provide a description of the sound event 20 and/or may be used to describe the sound event 20. For example, audio awareness manager 30 may identify a location of the user from a global positioning system (GPS) and/or from other location information on computer device 102. In addition, audio awareness manager 30 may communicate with one or more applications 26 on computer device 102 for context information 24. For example, audio awareness manager 30 may identify a time of the sound event 20. In addition, audio awareness manager 30 may access a calendar application to determine what a user may be doing when the sound event 20 occurred. In addition, audio awareness manager 30 may various detected sounds 18 to determine the context information 24.

As such, context information 24 may be retrieved from a variety of sources on computer device 102 to provide a context for the identified sound event 20. For example, audio awareness manager 30 may identify that a user is searching for recipes on the Internet at 6:30 p.m., while the location information of computer device 102 indicates that the user is at home. In addition, audio awareness manager 30 may detect various sounds 18 occurring in the kitchen (e.g., a user turning on a stove, closing a refrigerator, and turning on water). Audio awareness manager 30 may also detect a stove turning on. Audio awareness manager 30 may use all of this information to determine the context information 24 for the associated sound events 20 of turning on the stove is "cooking dinner."

At 610, method 600 may include updating a sound log with the sound event and the context information. Audio awareness manager 30 may also provide a sound log update 32 with the identified sound event 20 and/or associated context information 24 to a sound log 28. Sound log 28 may include a plurality of identified sound events 20 (up to m, where m is an integer) and any associated context information 24. The sound log 28 may be stored on computer device 102 and/or server 106. In addition, the sound log 28 may capture a chronological daily record of a user's sound events 20 and associated context information 24. Sound log 28 may be used by an assistant 10 and/or the user to provide an understanding of events taking place around the user, when the events occurred, and/or to provide a context to the events.

At 612, method 600 may optionally include querying the sound log to provide recommendations to a user. Assistant 10 may periodically query 34 the sound log 28 to identify specific sound events 36 around a user. Assistant 10 may use the specific sound events 36 and the corresponding context information 24 to provide one or more recommendations 14 and/or insights to the user. For example, assistant 10 may identify a sound event 36 of a "door open" and realize that a corresponding "door close" sound event may be missing from the sound log 28. Assistant 10 may notify a user that they may have left a back door open when leaving the house. In another example, assistant 10 may identify a sound event 36 of a front door opening in a store and may realize that the owner is currently located in the back of the store when the door opened. Assistant 10 may notify the owner that the front door of the store opened.

In addition, assistant 10 may receive a query and/or request 12 from a user and may provide a responses 15 to the user. Assistant 10 may query 34 the sound log 28 in response to the request 12. For example, a user may ask assistant 10 "where are my keys?" Assistant 10 may query 34 the sound log 28 for key sound events 20 and may retrieve the identified key sound events 36 and corresponding context information 24. The context information 24 may indicate that the keys are next to the sink. Assistant 10 may use the context information 24 to notify the user that "the keys are next to the sink."

As such, method 600 may be used to remember user actions (direct and indirect awareness) by listening to a user's daily sounds with at least one audio sensor. Moreover, method 600 may associate context information with the identified sound events to provide an understanding of events taking place around the user, when the events occurred, and/or to provide a context to the events.

Figure 7:
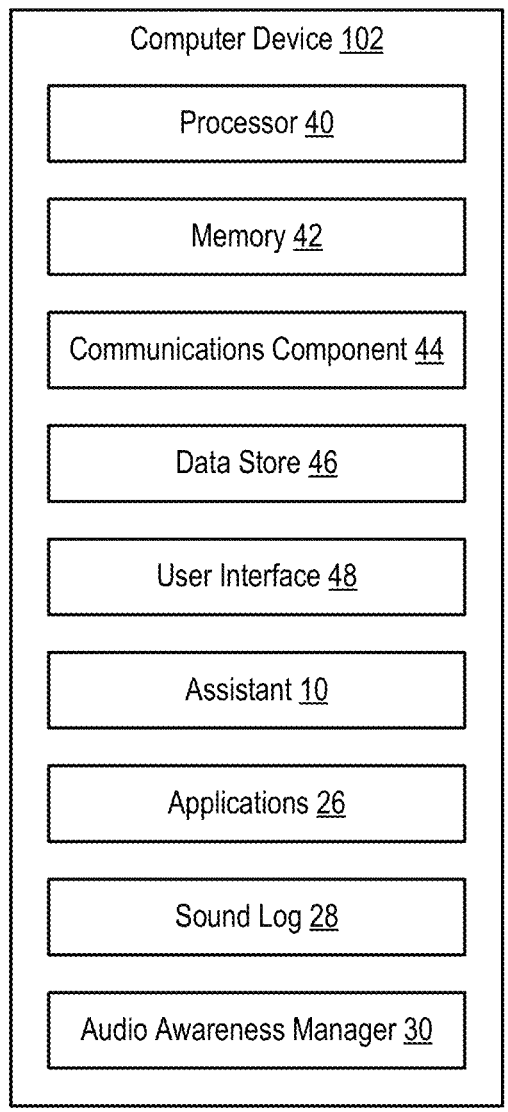
FIG. 7 is a schematic block diagram of an example device in accordance with an implementation of the present disclosure.

Referring now to FIG. 7, illustrated is an example computer device 102 in accordance with an implementation, including additional component details as compared to FIG. 1. In one example, computer device 102 may include processor 40 for carrying out processing functions associated with one or more of components and functions described herein. Processor 40 can include a single or multiple set of processors or multi-core processors. Moreover, processor 40 can be implemented as an integrated processing system and/or a distributed processing system.

Computer device 102 may further include memory 42, such as for storing local versions of applications being executed by processor 40. Memory 42 can include a type of memory usable by a computer, such as random access memory (RAM), read only memory (ROM), tapes, magnetic discs, optical discs, volatile memory, non-volatile memory, and any combination thereof. Additionally, processor 40 and memory 42 may include and execute operating system 110 (FIG. 1).

Further, computer device 102 may include a communications component 44 that provides for establishing and maintaining communications with one or more parties utilizing hardware, software, and services as described herein. Communications component 44 may carry communications between components on computer device 102, as well as between computer device 102 and external devices, such as devices located across a communications network and/or devices serially or locally connected to computer device 102. For example, communications component 44 may include one or more buses, and may further include transmit chain components and receive chain components associated with a transmitter and receiver, respectively, operable for interfacing with external devices.

Additionally, computer device 102 may include a data store 46, which can be any suitable combination of hardware and/or software, that provides for mass storage of information, databases, and programs employed in connection with implementations described herein. For example, data store 46 may be a data repository for assistant 10 (FIG. 1), applications 26 (FIG. 1), sound log 28 (FIG. 1), and/or audio awareness manager 30 (FIG. 1).

Computer device 102 may also include a user interface component 48 operable to receive inputs from a user of computer device 102 and further operable to generate outputs for presentation to the user. User interface component 48 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 48 may include one or more output devices, including but not limited to a display, a speaker, a haptic feedback mechanism, a printer, any other mechanism capable of presenting an output to a user, or any combination thereof.

In an implementation, user interface component 48 may transmit and/or receive messages corresponding to the operation of assistant 10, applications 26, sound log 28, and/or audio awareness manager 30. In addition, processor 40 executes assistant 10, applications 26, sound log 28, and/or audio awareness manager 30, and memory 42 or data store 46 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
a memory to store data and instructions;
a processor in communication with the memory; and
an operating system in communication with the memory and the processor, wherein the operating system is operable to:
receive, from at least one sensor on the computer device, a detected sound generated as a result of an event taking place around a user or generated by an object as a result of an action taken by the user on the object;
compare the detected sound to a plurality of audio patterns stored in a sound database;
identify a sound event for the detected sound based on a comparison of the detected sound to the plurality of audio patterns, wherein the sound event identifies the event taking place around the user or the action taken by the user on the object;
identify context information that describes the sound event; and
update a sound log with the sound event and the context information.

2. The computer device of claim 1, wherein the operating system is further operable to identify the sound event when a match occurs between the detected sound and at least one audio pattern of the plurality of audio patterns stored in the sound database.

3. The computer device of claim 1, wherein the context information includes at least one or more of a location of the computer device and a time when the detected sound occurred.

4. The computer device of claim 1, wherein the sound log provides a chronological order of a plurality of sound events and associated context information.

5. The computer device of claim 1, wherein the computer device further includes an assistant in communication with the memory, the processor, and the operating system, wherein the assistant is operable to:
query the sound log to provide recommendations to the user of the computer device.

6. The computer device of claim 5, wherein the assistant is further operable to:
receive a request from the user;
query the sound log based at least upon the request to identify the sound event and the context information associated with the sound event; and
provide a response to the request based on the context information associated with the sound event.

7. The computer device of claim 5, wherein the assistant is further operable to:
receive one or more audio patterns and corresponding sound events; and
upload the one or more audio patterns and the corresponding sound events to the sound database.

8. The computer device of claim 1, wherein the sound database is curated for the user of the computer device.

9. The computer device of claim 1, wherein the at least one sensor is part of a network of sensors in communication with the computer device.

10. The computer device of claim 1, wherein the context information identifies a time of the sound event or a location of the user from a global positioning system (GPS).

11. A method for creating a sound log of activities, comprising:
receiving, at an operating system executing on a computer device, a detected sound from at least one sensor on the computer device, wherein the detected sound is generated as a result of an event taking place around a user or generated by an object as a result of an action taken by the user on the object;
comparing the detected sound to a plurality of audio patterns stored in a sound database;
identifying a sound event for the detected sound based on a comparison of the detected sound to the plurality of audio patterns, wherein the sound event identifies the event taking place around the user or the action taken by the user on the object;
identifying context information that describes the sound event; and
updating the sound log with the sound event and the context information.

12. The method of claim 11, wherein identifying the sound event further comprises a match occurring between the detected sound and at least one audio pattern of the plurality of audio patterns stored in the sound database.

13. The method of claim 11, wherein the context information includes at least one or more of a location of the computer device and a time when the detected sound occurred.

14. The method of claim 11, wherein the sound log provides a chronological order of a plurality of sound events and associated context information.

15. The method of claim 11, further comprising:
querying the sound log to provide recommendations to the user of the computer device.

16. The method of claim 15, further comprising:
receiving a request from the user;
querying the sound log based at least upon the request to identify the sound event and the context information associated with the sound event; and
providing a response to the request based on the context information associated with the sound event.

17. The method of claim 15, further comprising:
receiving one or more audio patterns and corresponding sound events; and
uploading the one or more audio patterns and the corresponding sound events to the sound database.

18. The method of claim 11, wherein the sound database is curated for the user of the computer device.

19. The method of claim 11, wherein the at least one sensor is part of a network of sensors in communication with the computer device.

20. A non-transitory computer-readable medium storing instructions executable by a computer device, comprising:
at least one instruction for causing the computer device to receive, from at least one sensor on the computer device, a detected sound generated as a result of an event taking place around a user or generated by an object as a result of an action taken by the user on the object;
at least one instruction for causing the computer device to compare the detected sound to a plurality of audio patterns stored in a sound database;
at least one instruction for causing the computer device to identify a sound event for the detected sound based on a comparison of the detected sound to the plurality of audio patterns, wherein the sound event identifies the event taking place around the user or the action taken by the user on the object;
at least one instruction for causing the computer device to identify context information that describes the sound event; and
at least one instruction for causing the computer device to update a sound log with the sound event and the context information.

* * * * *